(12) United States Patent
Inomata

(10) Patent No.: US 10,668,369 B2
(45) Date of Patent: *Jun. 2, 2020

(54) GAME METHOD, GAME TERMINAL, AND GAME SYSTEM UTILIZING MAP DATA

(71) Applicant: COLOPL, Inc., Tokyo (JP)

(72) Inventor: Atsushi Inomata, Kanagawa (JP)

(73) Assignee: COLOPL, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,315

(22) Filed: Feb. 22, 2019

(65) Prior Publication Data

US 2019/0184279 A1    Jun. 20, 2019

Related U.S. Application Data

(63) Continuation of application No. 15/745,423, filed as application No. PCT/JP2016/070918 on Jul. 14, 2016, now Pat. No. 10,232,253.

(51) Int. Cl.
*A63F 13/216* (2014.01)
*A63F 13/69* (2014.01)
*A63F 13/235* (2014.01)
*A63F 13/35* (2014.01)
(Continued)

(52) U.S. Cl.
CPC .......... *A63F 13/216* (2014.09); *A63F 13/235* (2014.09); *A63F 13/35* (2014.09); *A63F 13/58* (2014.09); *A63F 13/65* (2014.09); *A63F 13/69* (2014.09)

(58) Field of Classification Search
None
See application file for complete search history.

(56) References Cited

U.S. PATENT DOCUMENTS

| 2003/0195044 | A1 | 10/2003 | Narita |
| 2007/0167231 | A1 | 7/2007 | Kim |
| 2007/0167237 | A1 | 7/2007 | Wang et al. |

(Continued)

FOREIGN PATENT DOCUMENTS

| JP | 2001-187271 A | 7/2001 |
| JP | 2002-49681 A | 2/2002 |

(Continued)

OTHER PUBLICATIONS

Office Action in JP Application No. 2015-146862, dated Jan. 4, 2016, 6pp.

(Continued)

*Primary Examiner* — Ronald Laneau
(74) *Attorney, Agent, or Firm* — Hauptman Ham, LLP

(57) ABSTRACT

A method including acquiring positional information for identifying a position of a terminal associated with a first player. The method further includes acquiring a map corresponding to a predetermined region having the position as a center of the map. The method further includes progressing a game associated with the first player based on the positional information and the map. The method further includes acquiring facility information for identifying a facility contained in the map. The method further includes setting a game parameter corresponding to the first player based on the facility information. The method further includes progressing the game based on the game parameter.

20 Claims, 5 Drawing Sheets

(51) Int. Cl.
*A63F 13/58* (2014.01)
*A63F 13/65* (2014.01)

(56) References Cited

U.S. PATENT DOCUMENTS

| | | | |
|---|---|---|---|
| 2008/0076569 A1 | 3/2008 | Tabata | |
| 2008/0076579 A1 | 3/2008 | Tabata | |
| 2012/0064969 A1 | 3/2012 | Uchibori | |
| 2012/0244945 A1* | 9/2012 | Kolo | A63F 13/61 463/42 |
| 2013/0289871 A1 | 10/2013 | Itagaki | |
| 2019/0240566 A1* | 8/2019 | Baba | A63F 13/216 |

FOREIGN PATENT DOCUMENTS

| | | |
|---|---|---|
| JP | 2003-62353 A | 3/2003 |
| JP | 2008-73263 A | 4/2008 |
| JP | 2008-517680 A | 5/2008 |
| JP | 2011-160934 A | 8/2011 |
| JP | 2012-24416 A | 2/2012 |
| JP | 2012-90928 A | 5/2012 |
| JP | 2012-165962 A | 9/2012 |
| JP | 2013-56193 A | 3/2013 |
| JP | 2015-54010 A | 3/2015 |
| JP | 2015-62671 A | 4/2015 |
| JP | 2015-119997 A | 7/2015 |

OTHER PUBLICATIONS

Notice of Allowance in JP Application No. 2015-146862, dated Feb. 26, 2016, 6pp.
"Ingress (Video Game)", Wikipedia, Jul. 3, 2015, pp. 1-7, http'//en.wikipedia.org/w/index.php?title=Ingress_(video_game)&oldid=669793210, 7pp.
International Search Report in PCT/JP2016/070918, dated Sep. 13, 2016, 4pp.

* cited by examiner

GAME METHOD, GAME TERMINAL, AND GAME SYSTEM UTILIZING MAP DATA

RELATED APPLICATIONS

The present application is a continuation of U.S. patent application Ser. No. 15/745,423 filed Jan. 16, 2018, which is National Stage of PCT International Application No. PCT/JP2016/070918, filed Jul. 14, 2016, which claims priority to Japanese Patent Application No. 2015-146862 filed Jul. 24, 2015. The disclosures of all of the above-listed prior-filed applications are hereby incorporated by reference herein in their entirety.

TECHNICAL FIELD

This disclosure relates to a game method, a game terminal, and a game system, which utilize map data.

BACKGROUND

Hitherto, there has been known a game configured to acquire a position of a terminal held by a player by utilizing a positioning system as represented by the GPS, and to allow a user to play the game while using the position of the terminal.

CITATION LIST

Patent Literature

[PTL 1] JP 2008-517680 A

SUMMARY

However, although the related art of Patent Literature 1 allows progress of a game in association with positional information on a player terminal by using the positional information, the related art only establishes a game map that is associated with a real map based on latitude-longitude parameters of the positional information. Therefore, the related art of Patent Literature 1 does not progress a game by acquiring game parameters from map data corresponding to the position of the player terminal.

At least one embodiment of this disclosure has a feature in that map data corresponding to positional information on a player terminal is acquired, and a game parameter is set or changed based on the map data, to thereby progress a game. Further, at least one embodiment of this disclosure allows a plurality of players to play games while competing or cooperating with each other based on map data corresponding to positional information on respective player terminals of those players. At least one embodiment of this disclosure proposes, for example, a method of setting a game parameter, which stimulates a feeling of tension and challenging spirit for progressing the game, and allows the user to enjoy the game in a more immersive manner.

That is, according to at least one embodiment of this disclosure, there is provided a method to be executed by a terminal of a first player. The method includes acquiring a position of the terminal of the first player. The method further includes acquiring a map of a fixed region having, as a center thereof, the position of the terminal of the first player. The method further includes acquiring any one of or both of facility information and map information contained in the acquired map. The method further includes setting a game parameter corresponding to the first player based on the acquired one of or both of facility information and map information. The method further includes progressing a game based on the set game parameter.

Further, according to at least one embodiment of this disclosure, there is provided a method to be executed by a system including a terminal of a first player and one or more other terminals held by one or more other players, respectively, which are capable of communicating to/from the terminal of the first player via a network. The method includes acquiring a position of the terminal of the first player. The method further includes acquiring a map of a fixed region determined as having, as a center thereof, the position of the terminal of the first player. The method further includes determining a certain number of chain regions by repeating the following a certain number of times: receiving respective positions of one or more other terminals in the determined fixed region via the network; determining, as a chain region, a next region having, as a center thereof, a terminal of a player closest to a terminal of a player corresponding to the determined fixed region among the one or more other terminals, to acquire a map of the chain region; and determining the chain region as a next determined fixed region. The method further includes acquiring any one of or both of facility information and map information contained in respective maps corresponding to the fixed region of the terminal of the first player and the certain number of chain regions. The method further includes setting a game parameter based on the acquired one of or both of facility information and map information. The method further includes progressing a game based on the set game parameter.

Further, according to at least one embodiment of this disclosure, there is provided a terminal. The terminal includes position acquisition means for acquiring a position of a terminal of a first player. The terminal further includes map acquisition means for acquiring a map of a fixed region having, as a center thereof, a position of the terminal of the first player. The terminal further includes facility information/map information acquisition means for acquiring any one of or both of facility information and map information contained in the acquired map. The terminal further includes game parameter setting means for setting a game parameter corresponding to the first player based on the acquired one of or both of facility information and map information. The terminal further includes game progress means for progressing a game based on the set game parameter.

Further, according to at least one embodiment of this disclosure, there is provided a system. The system includes a terminal of a first player. The system further includes one or more other terminals held by one or more other players, respectively, which are capable of communicating to/from the terminal of the first player via a network. The system further includes first position acquisition means for acquiring a position of the terminal of the first player. The system further includes first map acquisition means for acquiring a map of a fixed region determined as having, as a center thereof, the position of the terminal of the first player. The system further includes chain region determination means for determining a certain number of chain regions by causing the following means to execute processing a certain number of times: second position acquisition means for receiving respective positions of one or more other terminals in the determined fixed region via the network; second map acquisition means for determining, as a chain region, a next region having, as a center thereof, a terminal of a player closest to a terminal of a player corresponding to the determined fixed region among the one or more other terminals, to acquire a map of the chain region; and setting means for determining the chain region as a next determined fixed region. The system further includes facility information/map information acquisition means for acquiring any one of or both of facility information and map information contained in respective maps corresponding to the fixed region of the terminal of the first player and the certain number of chain regions. The system further includes game parameter setting means for setting a game parameter based on the acquired one of or both facility information and map information. The system further includes game progress means for progressing a game based on the set game parameter.

According to at least one embodiment this disclosure, utilizing the map data corresponding to the positional information on the player terminal to set or change the game parameter based on the map data, to thereby progress the game in a more amusing manner is possible.

The above-mentioned and other features and advantages of at least one embodiment of this disclosure become apparent from the following more specific descriptions of embodiments of this disclosure, the attached drawings, and the appended claims.

DETAILED DESCRIPTION

Figure 1:
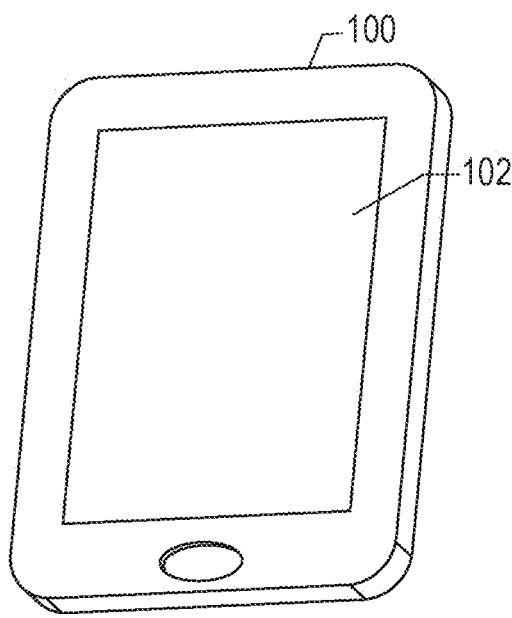
FIG. 1 is a diagram of an external view of a terminal according to at least one embodiment of this disclosure.

First, contents of some embodiments of this disclosure are described in a list. At least one embodiment of this disclosure has the following configurations.

(Item 1)
A method to be executed by a terminal of a first player. The method includes acquiring a position of the terminal of the first player. The method further includes acquiring a map of a fixed region having, as a center thereof, the position of the terminal of the first player. The method further includes acquiring any one of or both of facility information and map information contained in the acquired map. The method further includes setting a game parameter corresponding to the first player based on the acquired one of or both of facility information and map information. The method further includes progressing a game based on the set game parameter.

(Item 2)
A method to be executed by a system including a terminal of a first player and one or more other terminals held by one or more other players, respectively, which are capable of communicating to/from the terminal of the first player via a network. The method includes acquiring a position of the terminal of the first player. The method further includes acquiring a map of a fixed region determined as having, as a center thereof, the position of the terminal of the first player. The method further includes determining a certain number of chain regions by repeating the following steps a certain number of times: receiving respective positions of one or more other terminals in the determined fixed region via the network; determining, as a chain region, a next region having, as a center thereof, a terminal of a player closest to a terminal of a player corresponding to the determined fixed region among the one or more other terminals, to acquire a map of the chain region; and determining the chain region as a next determined fixed region. The method further includes acquiring any one of or both of facility information and map information contained in respective maps corresponding to the fixed region of the terminal of the first player and the certain number of chain regions. The method further includes setting a game parameter based on the acquired one of or both of facility information and map information. The method further includes progressing a game based on the set game parameter.

(Item 3)
A method according to Item 2, in which the first player and the one or more other players belong to the same group.

(Item 4)
A method according to Item 3, in which the game parameter is configured to give an effect on anyone of or all of a player character of the first player and player characters of respective players corresponding to the determined certain number of chain region.

(Item 5)
A method according to Item 2, further including determining respective sizes of the certain number of chain regions based on closeness of a relationship between one or more other players corresponding to the certain number of chain regions and the first player.

(Item 6)
A method according to Item 2, in which respective sizes of the certain number of chain regions gradually decrease every time the chain region is determined.

(Item 7)
A system for executing the method of any one of Items 1 to 6.

(Item 8)
A terminal, including position acquisition means for acquiring a position of a terminal of a first player. The terminal further includes map acquisition means for acquiring a map of a fixed region having, as a center thereof, the position of the terminal of the first player. The terminal further includes facility information/map information acquisition means for acquiring any one of or both of facility information and map information contained in the acquired map. The terminal further includes game parameter setting means for setting a game parameter corresponding to the first player based on the acquired one of or both of facility information and map information. The terminal further includes game progress means for progressing a game based on the set game parameter.

(Item 9)
A system, including a terminal of a first player. The system further includes one or more other terminals held by one or more other players, respectively, which are capable of communicating to/from the terminal of the first player via a network. The system further includes first position acquisition means for acquiring a position of the terminal of the first player. The system further includes first map acquisition means for acquiring a map of a fixed region determined as having, as a center thereof, the position of the terminal of the first player. The system further includes chain region determination means for determining a certain number of chain regions by causing the following means to execute processing a certain number of times: second position acquisition means for receiving respective positions of one or more other terminals in the determined fixed region via the network; second map acquisition means for determining, as a chain region, a next region having, as a center thereof, a terminal of a player closest to a terminal of a player corresponding to the determined fixed region among the one or more other terminals, to acquire a map of the chain region; and setting means for determining the chain region as a next determined fixed region. The system further includes facility information/map information acquisition means for acquiring any one of or both of facility information and map information contained in respective maps corresponding to the fixed region of the terminal of the first player and the certain number of chain regions. The system further includes game parameter setting means for setting a game parameter based on the acquired one of or both facility information and map information. The system further includes game progress means for progressing a game based on the set game parameter.

(Item 10)

A system according to Item 9, in which the first player and the one or more other players belong to the same group.

(Item 11)

A system according to Item 10, in which the game parameter is capable of giving an effect on any one of or all of a player character of the first player and player characters of respective players corresponding to the determined certain number of chain regions.

(Item 12)

A system according to Item 9, in which respective sizes of the certain number of chain regions are determined based on closeness of a relationship between one or more other players corresponding to the certain number of chain regions and the first player.

(Item 13)

A system according to Item 9, in which respective sizes of the certain number of chain regions gradually decrease every time the chain region is determined.

Now, at least one embodiment of this disclosure is described with reference to the drawings. However, at least one embodiment to which this disclosure can be applied is not limited thereto.

FIG. 1 is an external view of a terminal according to at least one embodiment of this disclosure. A terminal 100 in FIG. 1 includes a touch panel 102 having a screen display function. A device that exercises the screen display function of the touch panel 102 is herein referred to as "display 104". The touch panel 102 detects a touch operation by a player under control by a processor. The display 104 displays a graphic corresponding to a touch operation on the touch panel by the player. The terminal 100 is a device for implementing functions in FIG. 4. The terminal may be implemented by a terminal including a touch panel, such as a smartphone, a PDA, or a tablet computer, or may be implemented by other mobile terminals.

Figure 2:
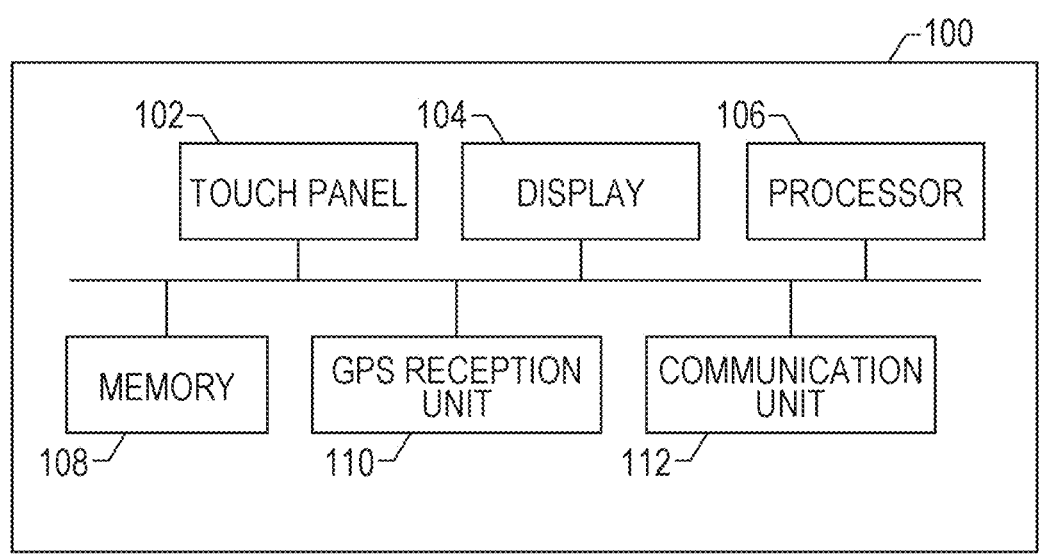
FIG. 2 is a hardware configuration diagram of a terminal 100 according to at least one embodiment of this disclosure.

Next, a description is given of an internal configuration of the terminal 100 with reference to FIG. 2. The terminal 100 may include a part or all of the touch panel 102, the display 104, a processor 106, a memory 108, a global positioning system (GPS) reception unit 110, and a communication unit 112, and those components are connected to one another via a bus in a manner that enables communication therebetween.

The touch panel 102 is incorporated into the display 104. The touch panel 102 has a function of outputting, in response to the surface of the touch panel 102 being touched by, for example, a finger, a stick, or a stylus pen, coordinate data corresponding to the touch position. The touch panel 102 detects a position of touch input by the player at predetermined sampling periods, and outputs coordinate data. The terminal 100 may not include the touch panel 102, and in at least one embodiment the terminal 100 includes, for example, an operation button capable of receiving input of selection by the user.

The display 104 displays various kinds of game images for respective frames based on image signals output from a display processing unit 420.

The memory 108 stores, for example, programs and data required for implementing this disclosure, and the player can enjoy a game using the touch panel 102 of the terminal 100 through execution of a program by the processor. The memory 108 temporarily stores data generated by the processor while the processor is operating in accordance with a program, or data to be used by the processor. The memory 108 can store, for example, a position of the terminal 100, a digital map database, positions of other player terminals acquired via a network, and individual information on the player holding the terminal 100. A game program, map data, and other pieces of data may be stored in the memory 108, or may be stored in the server 120 connected to the terminal 100 via a network. The digital map database is a database that holds data on a digital map. The map data is formed of a part or all of a map, map information, and facility information. The map may contain a part or all of, for example, a position, shape, and height of a road, the map information may contain a part or all of, for example, the type (e.g., expressway or national road) of a road and location name (e.g., intersection or interchange (IC)), and the facility information may contain a part or all of, for example, the name and type of a facility.

The GPS reception unit 110 receives signals (e.g., latitude and longitude of player terminal) transmitted from GPS satellites, and outputs reception results to the processor 106. The processor 106 can perform processing of calculating the location (e.g., latitude and longitude) of each player terminal based on the reception results given by the GPS reception unit 110.

The communication unit 112 establishes communication between the terminal 100 and an internal/external network under control by the processor. The communication unit 112 can transmit/receive various kinds of data to/from other players in a remote location via a communication network. Further, the communication unit 112 can acquire digital map data from the digital map database stored in the server, or can access the server. In a case where the communication unit 112 accesses the digital map data stored in the server, the memory 108 of the terminal 100 may not store the digital map data.

Figure 3:
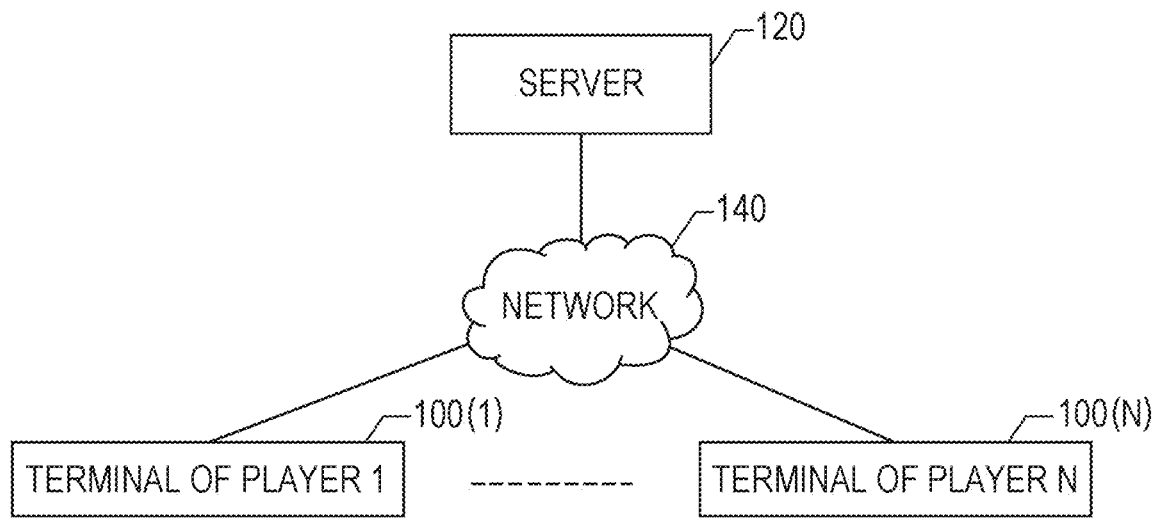
FIG. 3 is a configuration diagram of a system according to at least one embodiment of this disclosure.

FIG. 3 is a configuration diagram of a game system according to at least one embodiment of this disclosure. In this system, a terminal 100 (1) of a player 1 to a terminal 100 (N) of a player N are connected to the server 120 via a data communication network 140, for example, the Internet. The terminal 100 (1) to the terminal 100 (N) are each configured as in FIG. 4. In the following, when the terminal 100 (1) to the terminal 100 (N) are not particularly required to be distinguished from one another, those terminals are simply referred to as "terminals 100". The server 120 is implemented by a server computer mainly constructed by a processor, various kinds of storage apparatus, and data communication apparatus. The server 120 manages communication among the terminals 100, distributes various kinds of data required for execution of the game, and transmits/receives data to/from each player terminal 100. The player terminal 100 has a positioning function of receiving GPS satellite signals transmitted from GPS satellites and measuring, for example, the position of the user terminal by arithmetic processing.

Figure 4:
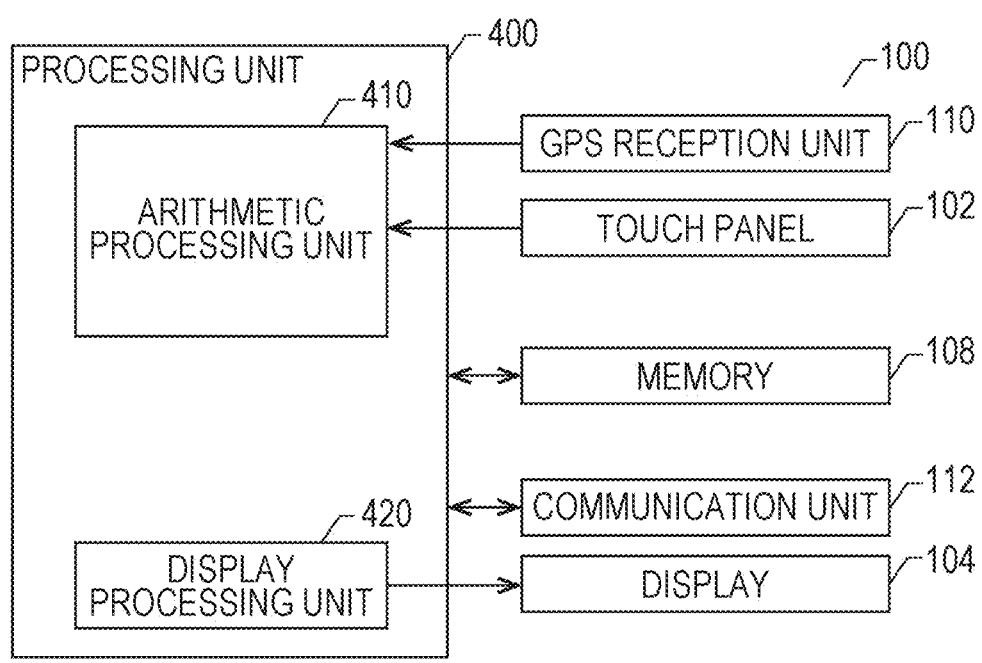
FIG. 4 is a block diagram of the terminal 100 according to at least one embodiment of this disclosure.

FIG. 4 is a functional block diagram of the terminal 100 according to at least one embodiment of this disclosure. The terminal 100 may include a processing unit 400. In FIG. 4, respective elements described as functional blocks for performing various kinds of processing can be constructed by one or more processors, memory, and other integrated circuits in terms of hardware, and can be implemented using instructions from various kinds of programs loaded into the memory in terms of software. Therefore, a person skilled in the art would understand that those functional blocks can be implemented by hardware or a combination of hardware and software. In at least one embodiment, a single hardware device is operable to implement multiple functional blocks. In at least one embodiment, each functional block is implanted by separate hardware devices. In the following, a description is given in detail of the operation of each function unit included in the processing unit 400 in FIG. 4.

An arithmetic processing unit 410 can acquire, for example, a map of a fixed region around the terminal 100 from the digital map database depending on the current position of the terminal acquired from the GPS reception unit 110. The arithmetic processing unit 410 may define the size of the fixed region in advance, for example, depending on the ability level of the player. The arithmetic processing unit 410 can execute calculation in real time depending on a change in position of the terminal 100, stores the calculated position of the terminal into the memory 108, and read the calculated position from the memory 108 as necessary.

The arithmetic processing unit 410 can activate an application and execute various kinds of processing required for the game based on an operation by the player that is acquired through, for example, the touch panel 102.

The arithmetic processing unit 410 can acquire current positions of the other terminals 100 (2 to N), which are transmitted from the other player terminals 100 (2 to N) via the network, from the communication unit 112 together with terminal identifiers of the other player terminals. Then, the arithmetic processing unit 410 can acquire, for example, maps of fixed regions around the other terminals 100 (2 to N) from the digital map database depending on the acquired current positions of the other terminals 100 (2 to N).

The arithmetic processing unit 410 can further acquire map information and facility information related to the fixed regions around the terminal 100 (1) and the other terminals 100 (2 to N) from the digital map database. In at least one embodiment of this disclosure, game parameters (e.g., ability level of player character and game item) can be changed or set based on the acquired map information and facility information on the fixed regions around the player terminals. For example, when the facility information on the fixed region having the terminal of the player 1 as a center contains a police station, a school, a restaurant, or a station, then, an offensive strength of a player character, an intelligence of the player character, a physical strength of the player character, or a moving speed of the player character, which are game parameters, can be given 10 points, respectively. Further, for example, when the facility information on the fixed region contains a plurality of restaurants, the physical strength of the player character can be given "' number of restaurants' *10 points". Further, for example, when the map information on the fixed region contains an express way or an IC, the moving speed of the player character can be given 10 points.

Further, for example, when the facility information on the fixed region having the position of the terminal of the player 1 as a center contains a hospital, a game item (medical herb), which is a game parameter, can be set at the location of the hospital in a real space, and when the facility information on the fixed region contains a public office, a game item (confidential document) can be set at the location of the public office in the real space.

Further, a high point can be given to a facility associated with, for example, a company having a partnership with the game played by the player. For example, when the player is provided with a game that has a partnership with the Japan Railways (JR) Group and the facility information on the fixed region contains a JR station, the JR station can be given a high point (e.g., 100 points). Through provision of a high point to a facility associated with, for example, an affiliated company, the player playing the game can be guided to willingly visit and use the facility.

The relationship among the game parameters, facility information, and map information described above is merely an example, and is set for each game in any manner. The fixed region around the terminal 100 is a region having the current position of the terminal 100 as a center, and may have a circular shape or other shapes with a variable size. When the fixed region around the terminal is large, the arithmetic processing unit 410 can change the scale of the region for display on the display 104.

Further, the arithmetic processing unit 410 can select various kinds of other player terminals associated with the terminal of the player 1 in accordance with a predetermined process. For example, the arithmetic processing unit 410 can select the terminal 100 of another player, which is located within the fixed region of the terminal 100 (1) of the player 1 and closest to the position of the terminal 100 of the player 1. In at least one embodiment of this disclosure, the ability level of the player character of a representative player can be changed or set based on the map information and facility information on the fixed region of the terminal of the player 1 and the map information and facility information on the fixed regions of other player terminals associated with the player 1. For example, the map information and facility information on the fixed regions having as centers other player terminals belonging to the same group as that of the player 1 can be absorbed and used to improve the ability level of the representative player (e.g., player 1). Meanwhile, the map information and facility information on the fixed regions having as centers other player terminals belonging to a group competing with the player 1 can be used to reduce the ability level of the player 1. Thus, the player 1 can acquire, for example, facility information based on the current positions of terminals held by the other players even without moving, to thereby change or set game parameters. The player 1 cannot usually grasp whether or not players of the same group exist around the current position of the player 1 and whether or not players of an opposition group exist. The player 1 has difficulty predicting whether or not a game is to be progressed advantageously or disadvantageously for himself or herself, and thus the game can be progressed in a more amusing manner.

Further, the arithmetic processing unit 410 can read personal information (e.g., hometown and birthday) on players stored in the memory of the terminal 100. The arithmetic processing unit 410 can create a group formed of players having the same attribute based on the personal information on each player. Further, the arithmetic processing unit 410 can change the size of the region having the terminal of the player as a center. For example, when the hometown of a player having the terminal 100(1) is Hokkaido, and the current position of the player is Hokkaido, for example, a map of a larger fixed region around the terminal 100 can be acquired. Further, on the birthdate of a player, for example, a map of a larger fixed region around the terminal 100 can be acquired.

The display processing unit 420 can display, on the display 104, a map of a fixed region having the current position of the terminal 100 as a center and maps of fixed regions having as centers the current positions of other player terminals belonging to the same group. Further, the display processing unit 420 can display a map on which, for example, facility information is superimposed, on the display 104.

[Outline of Game 1]

The game in at least one embodiment is a competitive game utilizing the position of a player terminal. The competitive game in at least one embodiment has two competing systems, namely, a normal competition and a group competition. In the normal competition, players existing at different positions compete with each other. In the following, a description is given of the case of the normal competition. The players can acquire maps of unified regions having the current positions as centers based on the current positions of the terminals held by themselves, extract map information and facility information from map data corresponding to the acquired maps, and change or set the game parameters (e.g., ability levels of player characters). For example, when the facility information contains a police station, the offensive strength of a player character is given 10 points. The player can increase the ability level of the player character by acquiring the map of a fixed region having the current position as center, to compete with an opponent player. In at least one embodiment of this disclosure, the ability of the player character can be changed dynamically depending on the current position of the player. Therefore, an interest level of a player in the game is maintained for various kinds of scenes.

[Outline of Game 2]

In the group competition, a plurality of groups each including one or more players can compete with each other. In the group competition, for example, maps of fixed regions acquired based on the terminal positions of players belonging to a first group may be used to determine the ability levels of the player characters corresponding to the fixed regions, or the maps of fixed regions acquired based on the terminal positions of all the players belonging to the first group may be used to determine only the ability level of the player character of the representative player.

Figure 5:
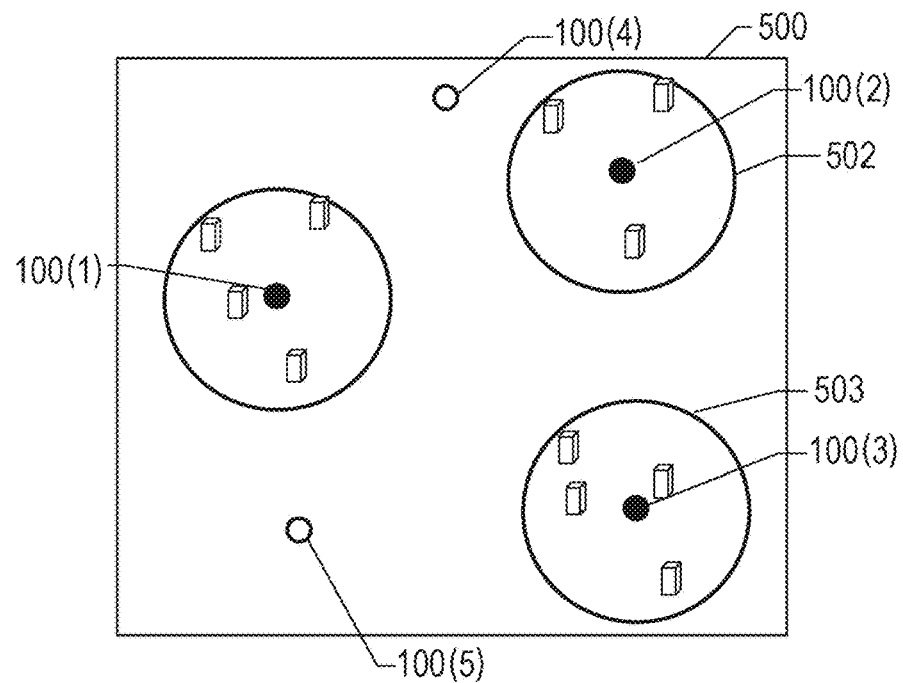
FIG. 5 is a diagram of a game screen in at least one embodiment of this disclosure.

FIG. 5 is a diagram of a game screen to be implemented by a system including the terminals 100 (1) to (5), which are connected to the network at separate positions and ready for communication, in at least one embodiment of this disclosure. In at least one embodiment, the number of terminals 100 is five, but may be six or more. The terminals 100 (1) to (3) of players 1 to 3 belong to the first group, and the terminals (4) and (5) of players 4 and 5 belong to a second group competing with the first group. The players 1, 2, 3, 4, and 5 are associated with the terminals 100 (1), (2), (3), (4), and (5), respectively. The first group is formed of the player 1 and the players 2 and 3 having a close relationship with the player 1, and the second group is formed of the player 4 and the player 5 having a close relationship with the player 4. In FIG. 5, a reference numeral 500 represents an example of the game screen to be displayed on the display of the terminal 100 (1) held by the player 1. In FIG. 5, the background of the game screen 500 has no color, but a map corresponding to the current terminal position may be displayed on the background. Black circles indicate positions on the map of the terminals 100 (1) to (3) belonging to the first group. Gray circles indicate positions on the map of the terminals 100 (4) and (5) belonging to the second group. Rectangular boxes indicate facilities existing in each region.

In at least one embodiment, the current positional information on the terminals 100 (1) to (3) held by the players 1 to 3 belonging to the first group can be used to acquire the map of each fixed region, extract facility information from the acquired map, and set or change the ability level of the character of the player 1, who is a representative player, based on the facility information. The current positional information on terminals held by the players 4 and 5 belonging to the second group are not used to set or change the ability level of the character of the player 1. In this manner, in the group competition, a larger amount of map data (e.g., facility information) capable of increasing the ability of one representative player character (player 1 in at least one embodiment) through cooperation by other players belonging to the same group is acquired, increasing the ability level of the representative player character, and competition with the other groups.

Further, the size of a fixed region determined based on the current positional information on the terminals 100 (1) to 100 (3) held by the players 1 to 3 belonging to the first group may be changed depending on, for example, the closeness of the non-spatial relationship with the player 1. For example, when the player 1 has a closer non-spatial relationship with the player 3 than with the player 2, the fixed region (third region, which is region 503 of FIG. 5) having the position of the player 3 as its center can be set larger than the fixed region (second region, which is region 502 of FIG. 5) having the position of the player 2 as its center. A parameter indicating the closeness of the relationship between players is stored in the memory.

Further, in at least one embodiment, a group is formed based on the closeness of the relationship between players. However, for example, the group may be formed so that the ability levels of players forming the groups are similar to each other, or the group may be formed depending on the attributes (e.g., hometown, hobby, and birthday month) of players.

Further, in FIG. 5, although the regions 502 and 503 do not overlap with each other, those regions may overlap with each other. When a facility is contained in the overlapping regions, the game parameters of the representative player character can be set or changed without counting the facility in a duplicate manner. For example, when the region 501 does not overlap with the regions 502 and 503 and only the regions 502 and 503 overlap with each other, the game parameter of the representative player character can be set or changed based on the facility information on one region obtained by taking a logical sum of the regions 502 and 503.

In at least one embodiment, the game can be progressed by setting the ability levels of player characters based not only on the positional information on the terminal of the player 1 but also on the positional information on the other players in the group. Thus, various kinds of game parameters (e.g., ability level of player character) related to the representative player can be increased through cooperation by other players having a close relationship with the representative player in the first group, to thereby progress the game in a more amusing manner.

[Outline of Game 3]

In the group competition, for example, when there are a large number of players belonging to the same group as that of the player 1, the ability level of the player character of the player 1 may be increased too much, setting of the ability level may take too much time, or the ability level of the player character of the player 1 may exceed those of player characters of the other groups too much. Therefore, in at least one embodiment, in the group competition, the number of other players in the same group who are allowed to cooperate with the player 1 to set the ability level of the player 1 is limited. For example, a predetermined number of responses may be received from other players who cooperated with the player 1 in order of arrival, to thereby set a limitation on the number of other players who cooperate with the player 1.

Further, another player able to cooperate with the player 1 can be selected based on a distance between the current position of the terminal 100 (1) of the player 1 and other player terminals of the same group as that of the player 1, with the limitation on the number of other players to be selected. In the following, a description is given of at least one embodiment of this disclosure in a case in which another player to cooperate with the player 1 is selected based on a distance between the player terminal 100 (1) of the player 1 and other player terminals of the same group as that of the player 1, with the limitation (e.g., two) on the number of other players to be selected.

Figure 6:
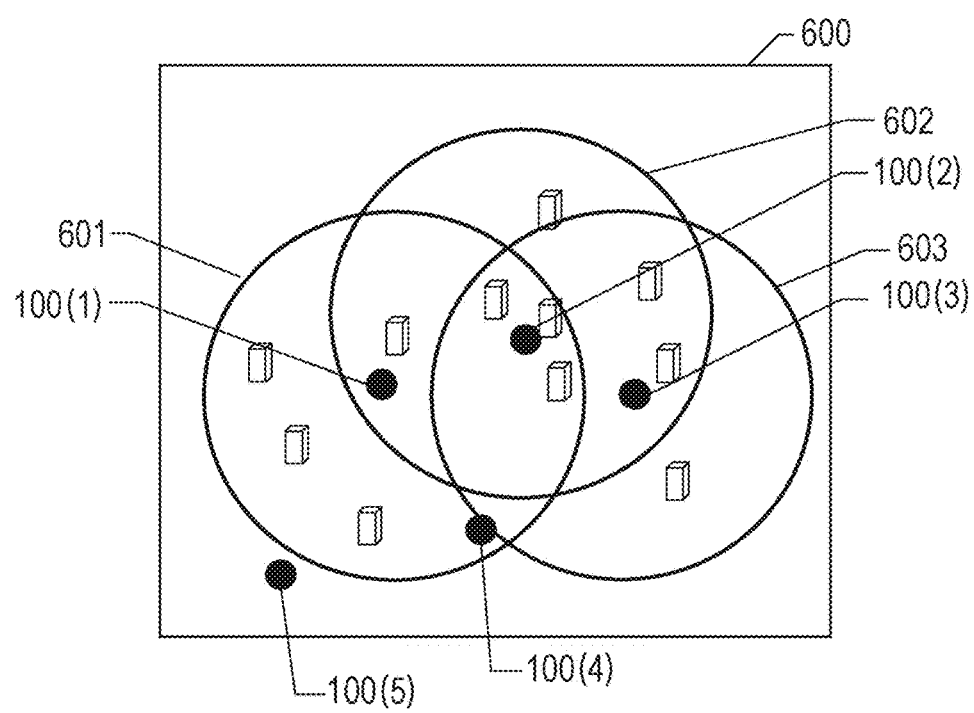
FIG. 6 is a diagram of a game screen in at least one embodiment of this disclosure.

FIG. 6 is a diagram of a game screen to be implemented by a system including the five terminals 100 (1) to (5), which are connected to the network at separate positions and ready for communication, in at least one embodiment of this disclosure. In at least one embodiment, the number of terminals 100 is five, but may be six or more. The players 1 to 5 belong to the same group, and the players 1, 2, 3, 4, and 5 are associated with the terminals 100 (1), (2), (3), (4), and (5), respectively. In FIG. 6, a reference numeral 600 represents an example of the game screen to be displayed on the display of the terminal 100 (1) held by the player 1. In FIG. 6, the background of the game screen 600 has no color, but a map may be displayed on the background. Black circles indicate positions on the map of the terminals 100 (1) to (5) belonging to the first group.

In the following, a description is given of processing to be executed by the terminal 100 (1).

First, the arithmetic processing unit 410 determines a fixed region (first region) having the current position of the terminal 100 (1) as a center based on the current position of the player 1, and acquires a map of the first region (region 601 of FIG. 6).

Next, the arithmetic processing unit 410 acquires all of the positions of terminals (terminals 100 (2) and 100 (4) in FIG. 6) held by players of the same group as that of the player 1 in the first region and identifiers of those terminals. Next, the arithmetic processing unit 410 selects another player terminal 100 (2), which is in the first region and closest to the position of the terminal 100 (1) of the player 1.

Next, the arithmetic processing unit 410 of the terminal of the player 1 determines a second region (region 602 of FIG. 6) having the position of the terminal of the player 2 as a center. The arithmetic processing unit 410 acquires the positions of all the terminals (terminal 100 (3) in FIG. 6) in the same group as that of the player 2 in the second region. The arithmetic processing unit 410 determines a terminal of the player 3, which is in the second region (region 602 of FIG. 6) and closest to the position of the terminal of the player 2. At this time, terminals that have been selected in the past are not selected again. Next, the arithmetic processing unit 410 determines a third region having the position of the terminal of the player 3 as its center (terminal 100 (3) in FIG. 6). When the upper limit number of other players to cooperate with the player 1 is two, processing of selecting other player terminals is finished. The second region and the third region are determined in such a manner as to be connected like a chain in order based on determination of the first region, and thus those regions are herein referred to as "chain regions" (of the first region).

Next, a map of the first region having the position of the terminal of the player 1 as a center, a map of the second region having the position of the selected terminal of the player 2 as a center, and a map of the third region having the position of the selected terminal of the player 3 as a center are acquired, facility information is extracted from the acquired maps, and the ability level of the character of the player 1, who is a representative player, is changed or set based on the facility information.

In FIG. 6, the first region 601, the second region 602, and the third region 603 are connected in an overlapping manner. The first region, the second region, and the third region are chain regions in which game parameters of players in the same group can be given certain effects. The ability levels of player characters corresponding to the players other than the player 1, namely, the players 2 and 3, can also be changed or set based on the facility information extracted from the maps of the first region, the second region, and the third region. When the overlapping chain regions contain the same facility, the facility can be used only one time to set or change the game parameters of the representative player character.

In other modes of at least one embodiment, a facility contained in a region in which two or more of the first region 601, the second region 602, and the third region 603 overlap with each other can be given a higher point than a facility contained in a non-overlapping region, to set or change the ability level of the representative player character. For example, when a police station is contained in a non-overlapping region, the offensive strength of a player character is given 10 points, when a police station is contained in a double overlapping region, the offensive strength of a player character is given 100 points, and when a police station is contained in a triple overlapping region, the offensive strength of a player character is given 200 points. In this manner, as distances between players becomes closer, the overlapping region becomes larger, a facility contained in the overlapping region is given a higher point, and the group can progress the game more advantageously.

In other modes of at least one embodiment, a facility contained in a chain region overlapping with the first region corresponding to the representative player character is given a higher point, and a facility contained in a chain region, which is farther away from the first region corresponding to the representative player character or takes a larger number of chain steps from the first region, is given a lower point. For example, when the second region overlaps with the first region but the third region does not overlap with the first region and overlaps only with the second region, a facility contained in the third region is given a lower point than a facility contained in the second region.

[Outline of Game 4]

In at least one embodiment, every time another terminal is selected, the size of a region for acquiring map data is gradually reduced to set a limitation on the number of other players who cooperate with the player 1.

In the following, a description is given of at least one embodiment of this disclosure in a case in which another player to cooperate with the player 1 is selected based on a distance between the player terminal 100 (1) of the player 1 and other player terminals of the same group as that of the player 1, with the number of other players to be selected being determined by gradually causing the size of the acquired region to converge.

Figure 7:
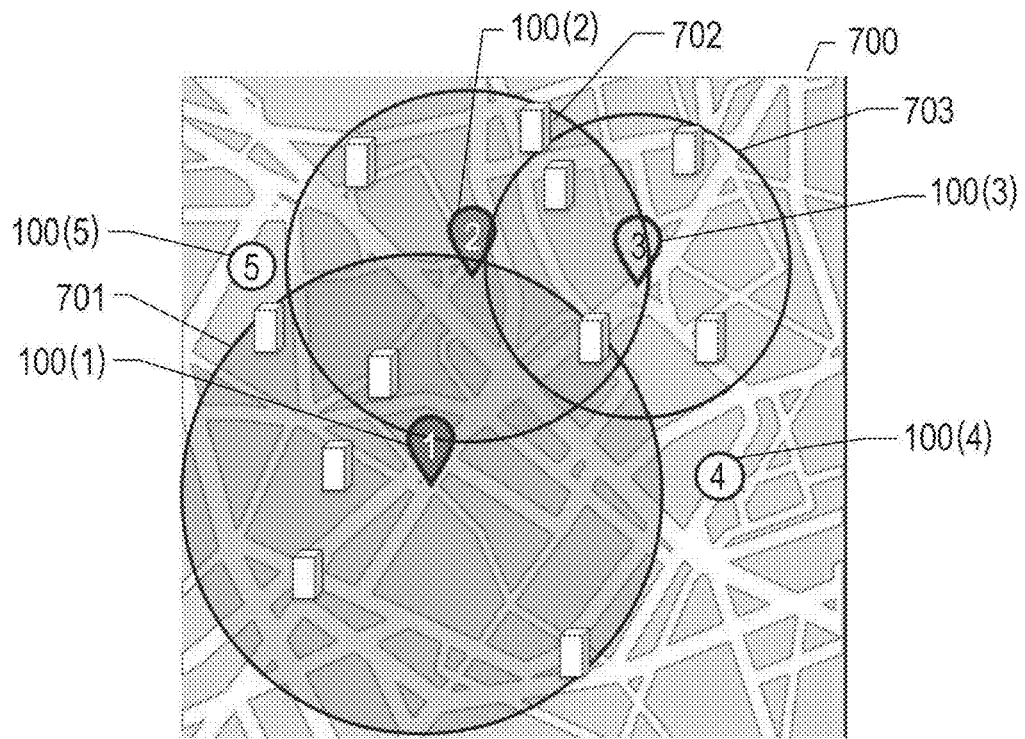
FIG. 7 is a diagram of a game screen in at least one embodiment of this disclosure.

FIG. 7 is a diagram of a game screen to be implemented by the system including the five terminals 100 (1) to (5), which are connected to the network at separate positions and ready for communication, in at least one embodiment of this disclosure. In at least one embodiment, the number of terminals 100 is five, but may be six or more. The players 1 to 5 belong to the same group, and the players 1, 2, 3, 4, and 5 hold the terminals 100 (1), (2), (3), (4), and (5), respectively.

In at least one embodiment, the fixed region (first region, which is region 701 of FIG. 7) having the current position of the terminal of the player 1 as its center is largest, the fixed region (second region, which is region 702 of FIG. 7) having as its center the current position of the second terminal (100 (2) of FIG. 7) selected based on the current position of the terminal of the player 1 is smaller than the first region, and the fixed region (third region, which is region 703 of FIG. 7) having as a center the current position of the third terminal (100 (3) of FIG. 7) selected based on the current position of the second terminal is smaller than the second region. In this manner, every time a terminal is selected additionally, the size of a region for acquiring the map data is gradually reduced, and the processing is finished when the size of the region has converged to a predetermined size (e.g., zero). The size of the region having the position of the player terminal as a center can be set so as to decrease at a fixed rate, or the rate of reducing regions can be changed depending on, for example, the closeness of the relationship with the player 1. Further, a player terminal that has been selected before can be set so as not to be selected again.

A map of the first region having the position of the terminal of the player 1 as a center is acquired, facility information is extracted from the acquired map, and game parameters are set or changed based on the facility information. For example, when the extracted facility information contains a hospital, a game item, for example, a recovery item, can be set at the position of the hospital. The second region 702 having the position of the terminal of the selected player 2 as its center and the third region 703 having the position of the terminal of the selected player 3 as its center are chain regions in which a game operation by the player 1 gives a certain effect indirectly. For example, the player 1 uses a game item (recovery item) capable of giving a certain effect only on the first group at the current position. Then, the character of the player 2 existing in the second region and the character of the player 3 existing in the third region are given effects by the game operation (use of recovery item) by the player 1 to recover their physical strengths. Characters of the players 4 and 5 do not exist in the second region and the third region, and thus are not given effects by the game operation of the player 1.

In other modes of at least one embodiment, the player 1 may acquire the map of the first region having the current position of the terminal as a center, set or change game parameters based on the facility information extracted from the acquired map, and call other players of the first group via the network for an instruction to gather in a range in which the player 1 can give a certain effect. When the player 1 confirms that the other players of the first group have gathered, the player 1 uses a game item (recovery item) that can give a certain effect only on the first group at the current position. Then, characters of the other players gathering in the chain region in which the player 1 can give a certain effect receive effects by the game operation (use of recovery item) by the player 1 to recover, for example, physical strength.

In at least one embodiment, setting or changing game parameters is possible based on, for example, map information extracted based on the first region having the current position of the player 1 as a center. Further, setting or changing game parameters of player characters of the same group is possible based on the changed or set game parameters.

[Outline of Game 5]

In at least one embodiment, a description is given of at least one embodiment of this disclosure in a case in which another player to be given a certain effect depending on an operation by the player 1 is selected based on distances between the player terminal 100 (1) of the player 1 and other player terminals of a group competing with the player 1, with the limitation (e.g., two) on the number of other players to be selected.

Figure 8:
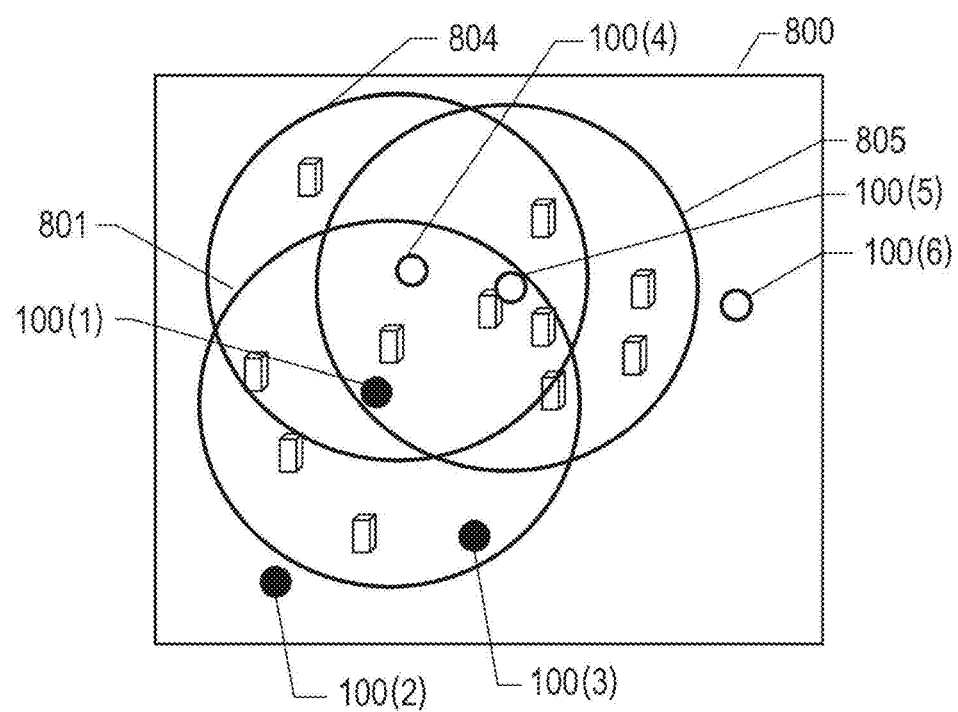
FIG. 8 is a diagram of a game screen in at least one embodiment of this disclosure.

FIG. 8 is a diagram of a game screen to be implemented by a system including six terminals 100 (1) to (6), which are connected to the network at separate positions and ready for communication, in at least one embodiment of this disclosure. In at least one embodiment, the number of terminals 100 is six, but may be seven or more. The players 1 to 3 belong to the first group, the players 4 to 6 belong to the second group, and the players 1, 2, 3, 4, 5, and 6 hold the terminals 100 (1), (2), (3), (4), (5), and (6), respectively. In FIG. 8, a reference numeral 800 represents an example of the game screen to be displayed on the display of the terminal 100 (1) held by the player 1. Black circles indicate positions on the map of the terminals 100 (1) to (3) belonging to the first group. Gray circles indicate positions on the map of the terminals 100 (4) to (6) belonging to the second group.

In the following, a description is given of processing to be executed by the terminal 100 (1).

First, the arithmetic processing unit 410 determines a fixed region (first region) having the current position of the terminal 100 (1) as a center based on the current position of the player 1, and acquires a map of the first region (region 801 of FIG. 8).

Next, the arithmetic processing unit 410 acquires all the positions and identifiers of all the terminals (including terminal 100 (4) and terminal 100 (5) in FIG. 8) held by the players of the second group competing with the player 1 in the first region. Next, the arithmetic processing unit 410 selects the player terminal 100 (4) of another player 4 belonging to the second group, which is in the first region and closest to the position of the terminal 100 (1) of the player 1.

Next, the arithmetic processing unit 410 of the terminal of the player 1 determines a second region (region 804 of FIG. 8) having the position of the terminal of the player 4 as a center. The arithmetic processing unit 410 acquires the positions of all the terminals (terminal 100 (5) in FIG. 8) in the second group in the second region. The arithmetic processing unit 410 determines a terminal of the player 5, which is in the second region (region 804 of FIG. 8) and closest to the position of the terminal of the player 1. Next, the arithmetic processing unit 410 determines a third region (region 805 of FIG. 8) having the position of the terminal of the player 5 as a center (terminal 100 (5) in FIG. 8). When the upper limit number of other players to be selected is two, the processing of selecting other player terminals is finished.

Next, a map of the first region having the position of the terminal of the player 1 as a center is acquired, map information is extracted from the acquired map, and the game parameters are set or changed based on the map information. For example, when the extracted facility information contains an IC, a game item, for example, a bomb, is set at the position of the IC. The second region 804 having the position of the terminal of the selected player 4 as a center and the third region 805 having the position of the terminal of the selected player 5 as a center are chain regions in which a game operation by the player 1 gives a certain effect indirectly. For example, the player loses a game item(bomb) capable of giving a certain effect only on the second group, which is an opponent group, at the current position. Then, the character of the player 4 existing in the second region and the character of the player 5 existing in the third region are given effects by the game operation (use of bomb) by the player 1 so that their physical strengths are dropped to a zero point. The character of the player 6 does not exist in either of the second region and the third region, and thus is not given a certain effect by a game operation by the player 1.

In at least one embodiment, setting or changing game parameters is possible based on map information extracted based on the first region having the current position of the player 1 as its center. Further, setting or changing game parameters of player characters of the opponent group is possible based on the set or changed game parameters.

[Outline of Game 6]

When other players to cooperate with the player 1 are close to the player 1, for example, when there are a larger number of players of the same group in the same building, fixed regions having the positions of respective players as centers may be substantially the same as one another. Thus, in at least one embodiment, when the current position of the terminal of the player 1 is acquired, a terminal that is separated from all the other terminals, which belong to the same group in the first region having the current position of the terminal of the player 1 as a center, by a certain distance or more is selected from among those terminals.

More specifically, when the current position of the terminal of the player 1 is acquired, the first region having the current position of the terminal of the player 1 as a center is determined. Next, the arithmetic processing unit 410 of the terminal of the player 1 acquires the current positions of all the terminals 100 of the same group as that of the player 1 in the first region. Next, the arithmetic processing unit 410 selects the terminal 100 of a player in the first region that is separated from the position of the terminal 100 (1) of the player 1 by a predetermined distance or more and at the same time is closest to the terminal 100 (1) of the player 1. In at least one embodiment, when there are no terminals of other players that are separated from the position of the terminal 100 (1) of the player 1 by a predetermined distance or more, none of those terminals is selected. In this manner, selection of a terminal that is separated from the position of the terminal 100 (1) of the player 1 by a predetermined distance or more enables prevention of determination of the same region.

Figure 9:
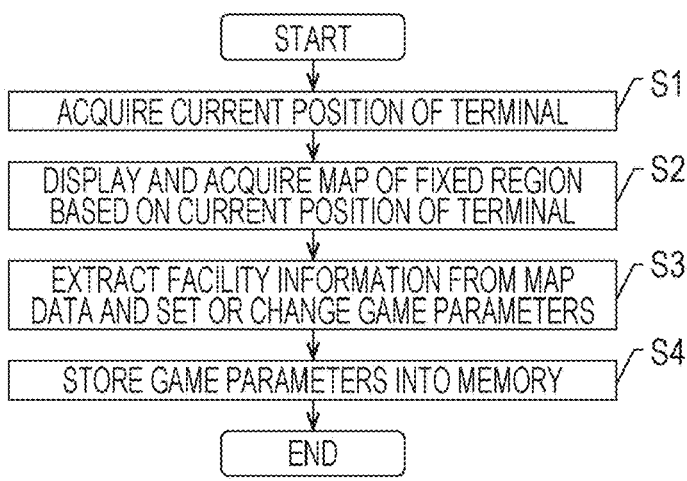
FIG. 9 is a flowchart of processing to be executed by the terminal 100 in at least one embodiment of this disclosure.

FIG. 9 is a processing flow of processing of a program for a normal competitive game in at least one embodiment of this disclosure. As an example, the processing flow corresponds to at least one embodiment described in [Outline of Game 1].

First, a game program stored in the memory is activated based on an operation performed on, for example, the touch panel 102 of the terminal 100 (1) of the player 1, and the game program is started to be executed. The terminal 100 (1) of the player 1 is connected to the terminals 100 (2 to N) held by one or more other players via the network in a manner that enables communication there among. The flowchart in FIG. 9 is executed after completion of the above-mentioned processing. Processing of each step in the flowchart in FIG. 9 is merely one example, and the order of processing of each step may be switched as long as the same effect can be obtained. In the following, a description is given of processing to be executed by the terminal 100 (1) of the player 1.

First, in Step S1, the arithmetic processing unit 410 acquires the current position of the terminal 100 (1) of the player 1 from the GPS reception unit 110.

Next, in Step S2, the display processing unit 420 determines the map of the fixed region having the acquired current position of the terminal 100 (1) as a center, and outputs a part or all of the map information and facility information corresponding to the map to the display 104 together with the obtained map. When the player 1 checks, for example, the obtained map displayed on the display 104 and determines that, for example, the obtained map is to be acquired, the player 1 uses, for example, the touch panel 102 of the terminal 100 to conduct processing of acquiring the map.

Then, in Step S3, the arithmetic processing unit 410 acquires the obtained map, and a part or all of the map information and facility information corresponding to the map in accordance with the acquisition processing conducted by the player 1, for storage into the memory 108. Further, the arithmetic processing unit 410 sets or changes game parameters (e.g., ability level of player character of player 1) based on the acquired map information and facility information.

Figure 10:
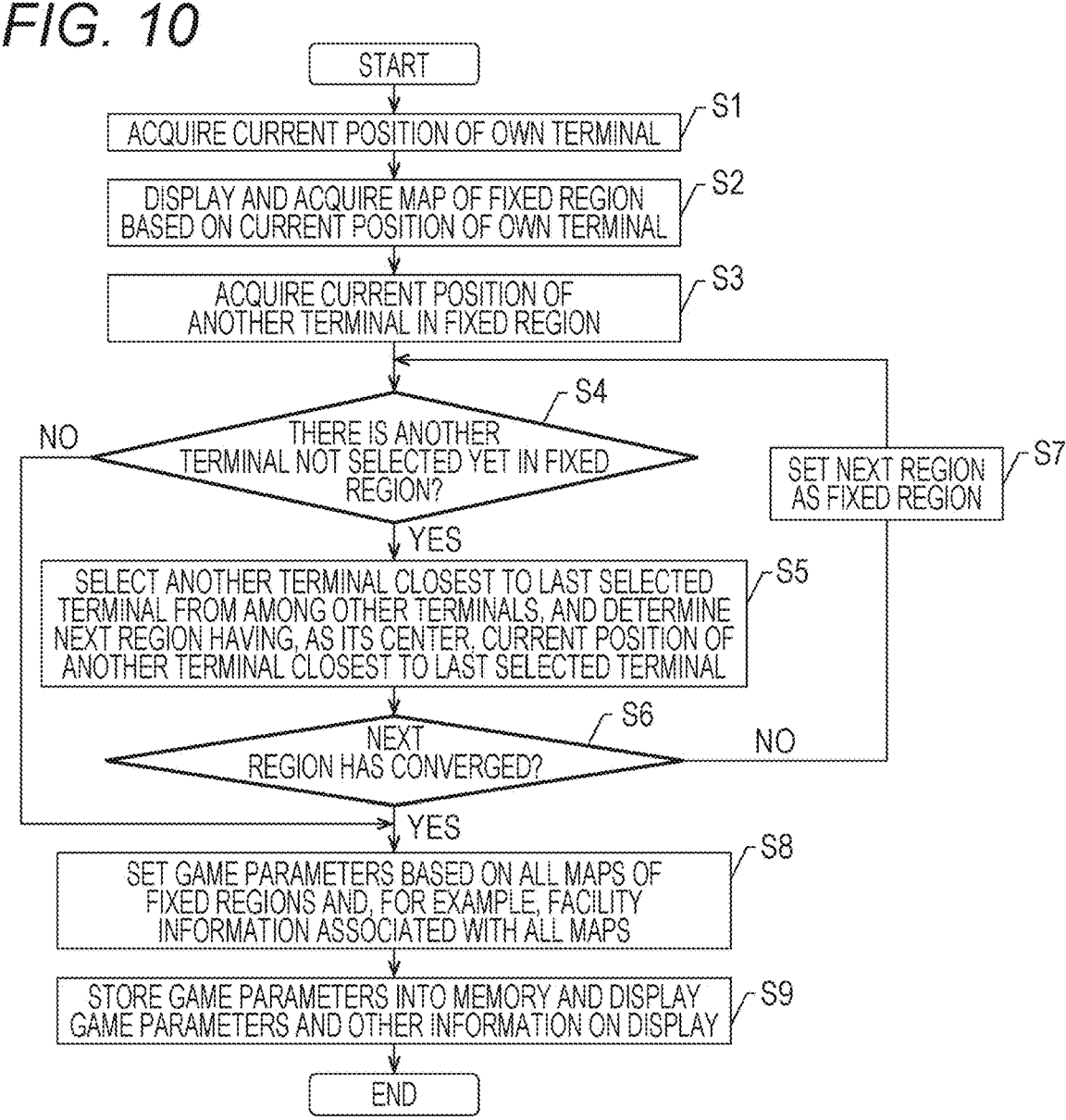
FIG. 10 is a flowchart of processing to be executed by the terminal 100 in at least one embodiment of this disclosure.

FIG. 10 is a processing flow of processing of a group competitive game program in at least one embodiment of this disclosure. The processing flow corresponds to the embodiment described in [Outline of Game 4].

First, a game program stored in the memory is activated based on an operation performed on, for example, the touch panel 102 of the terminal 100 (1) of the player 1, and the game program is started to be executed. The terminal 100 (1) of the player 1 is connected to the terminals 100 (2 to N) held by one or more other players via the network in a manner that enables communication there among. The flowchart in FIG. 10 is executed after completion of the above-mentioned processing. Processing of each step in the flowchart in FIG. 10 is merely one example, and the order of processing of each step may be switched as long as the same effect can be obtained. In the following, a description is given of processing to be executed by the terminal 100 (1) of the player 1.

First, in Step S1, the arithmetic processing unit 410 acquires the current position of the terminal 100 (1) of the player 1 from the GPS reception unit 110.

Next, in Step S2, the display processing unit 420 determines the map of the fixed region (first region) having the acquired current position of the terminal 100 (1) as a center, and outputs a part or all of the map information and facility information corresponding to the map to the display 104 together with the obtained map. When the player 1 checks, for example, the obtained map displayed on the display 104 and determines that, for example, the obtained map is to be acquired, the player 1 uses, for example, the touch panel 102 of the terminal 100 to conduct processing of acquiring the map. Then, the arithmetic processing unit 410 acquires the obtained map, and a part or all of the map information and facility information corresponding to the map in accordance with the acquisition processing conducted by the player 1, for storage into the memory 108.

Next, in Step S3, the communication unit 112 of the terminal 100 (1) receives, via the network, the current positions and terminal identifiers of one or more all the other terminals 100 in a fixed region having the current position of the terminal 100 (1) held by the player 1 as a center.

Next, in Step S4, the arithmetic processing unit 410 determines whether or not there is another terminal not selected yet in Step S5 among one or more all the other terminals 100 in the fixed region (first region) corresponding to the terminal 100 (1). When there is another terminal not selected yet, the processing proceeds to Step S5. In Step S4, when there is no other terminals not selected yet in Step S5, the processing proceeds to Step S8.

Next, in Step S5, the arithmetic processing unit 410 selects a terminal closest to the terminal 100 (1) among one or more all the other terminals 100 in the fixed region (first region). Then, a next region (second region) having the current position of the selected terminal as its center is determined. In this case, the arithmetic processing unit 410 sets the next region (second region) smaller than the first region.

Next, in Step S6, the arithmetic processing unit 410 determines whether or not the size of the determined next region (second region) has converged to a predetermined size. When the size of the determined next region has not converged to the predetermined size, the processing proceeds to Step S7.

Next, in Step S7, the determined next region (second region) is set as a fixed region, and the processing proceeds to Step S4.

In Step S4, the arithmetic processing unit 410 determines whether or not there is another terminal not selected yet in Step S5 among one or more all the other terminals 100 in the fixed region (second region). When there is another terminal not selected yet, the processing proceeds to Step S5.

Next, in Step S5, the arithmetic processing unit 410 selects a terminal closest to the last selected terminal 100 from among one or more all the other terminals 100 in the fixed region (second region). Then, the next region (third region) having the current position of the last selected terminal as a center is determined. In this case, the arithmetic processing unit 410 sets the next region (third region) smaller than the second region.

Next, in Step S6, the arithmetic processing unit 410 determines whether or not the size of the determined next region (third region) has converged to the predetermined size. When the size of the determined next region (third region) has not converged to the predetermined size, the processing proceeds to Step S7. In this manner, the processing of Step S4 to Step S7 is repeated until the size of the determined next region converges to the predetermined size.

When the size of the determined next region has converged to the predetermined size, the processing proceeds to Step S8.

In Step S8, the arithmetic processing unit 410 acquires all the maps of one or more determined regions together with a part or all of the map information and facility information corresponding to the maps. Then, the arithmetic processing unit 410 sets or changes game parameters required for progress of the game based on the acquired map information and facility information. For example, in FIG. 7, the arithmetic processing unit 410 acquires all the maps of the first region 701 having the position of the terminal 100 (1) of the player 1 as a center, the second region 702 having the position of the terminal 100 (2) of the player 2 as a center, and the third region 703 having the position of the terminal 100 (3) of the player 3 as a center, and also acquires all the facility types (e.g., police station or public office) of the facility information corresponding to those maps. Then, the ability level of the player character 1 is calculated based on the acquired facility types and the number of facilities. For example, when three police stations are contained, 10×3 points are given to the offensive force of the player character 1.

Next, the arithmetic processing unit 410 stores game parameters set or changed in Step S7 into the memory.

Then, the display processing unit 420 outputs to the display 104 the acquired map, and the map information and facility information corresponding to the map together with the set or changed game parameters. The player 1 can compete with other groups based on the set or changed game parameters.

This disclosure is not limited to the embodiments described above, and other embodiments and applications of this disclosure would be apparent to a person skilled in the art in consideration of specifics and techniques of this disclosure disclosed herein. In particular, although this disclosure has been illustrated and described with reference to some embodiments, a person skilled in the art would understand that various modifications can be made to those embodiments without departing from the spirit and scope of this disclosure described in the appended claims.

What is claimed is:

1. A method comprising:
acquiring positional information, using a global positioning system (GPS) unit, for identifying a position of a terminal associated with a first player;
acquiring a map including a first region having the position as a center of the first region;
progressing a game associated with the first player based on the positional information and the map;
acquiring facility information for each of a plurality of facilities contained in the map;
setting a game parameter corresponding to the first player based on the facility information associated with at least one facility of the plurality of facilities; and
progressing the game based on the game parameter.

2. The method according to claim 1, further comprising:
acquiring a position of a second terminal within the first region, wherein the second terminal is associated with a second player.

3. The method according to claim 2, further comprising:
defining a second region having the position of the second terminal as a center of the second region, wherein a size of the second region is different from a size of the first region.

4. The method according to claim 2, further comprising:
sharing effects of the game parameter with a second player.

5. The method according to claim 3, further comprising:
determining whether any additional terminals are located within the second region; and
acquiring positional information for a third terminal of the additional terminals in response to the third terminal being located within the second region.

6. The method according to claim 4, further comprising:
sharing effects of the game parameter with a third player, wherein the third terminal is associated with the third terminal.

7. The method according to claim 6, wherein the third terminal is outside of the first region.

8. The method according to claim 4, wherein the sharing the effects of the game parameter comprises determining whether the second player is an opponent of the first player.

9. The method according to claim 1, further comprising:
preventing the game parameter from effecting players associated with additional terminals located outside of the first region.

10. A system comprising:
a non-transitory computer readable medium configured to store instructions thereon;
a global positioning system (GPS) unit in communication with the non-transitory computer readable medium; and
a processor connected to the non-transitory computer readable medium, wherein the processor is configured to execute the instructions for:
acquiring positional information, using the GPS unit, for identifying a position of a terminal associated with a first player;
acquiring a map including a first region having the position as a center of the first region;
progressing a game associated with the first player based on the positional information and the map;
acquiring facility information for each of a plurality of facilities contained in the map;
setting a game parameter corresponding to the first player based on the facility information associated with at least one facility of the plurality of facilities; and
progressing the game based on the game parameter.

11. The system according to claim 10, wherein the processor is configured to execute the instructions for:
acquiring a position of a second terminal within the first region, wherein the second terminal is associated with a second player.

12. The system according to claim 11, wherein the processor is configured to execute the instructions for:
defining a second region having the position of the second terminal as a center of the second region, wherein a size of the second region is different from a size of the first region.

13. The system according to claim 11, wherein the processor is configured to execute the instructions for:
sharing effects of the game parameter with a second player.

14. The system according to claim 12, wherein the processor is configured to execute the instructions for:
determining whether any additional terminals are located within the second region; and
acquiring positional information for a third terminal of the additional terminals in response to the third terminal being located within the second region.

15. The system according to claim 13, wherein the processor is configured to execute the instructions for:
sharing effects of the game parameter with a third player, wherein the third terminal is associated with the third terminal.

16. The system according to claim 15, wherein the third terminal is outside of the first region.

17. The system according to claim 13, wherein the processor is configured to execute the instructions for sharing the effects of the game parameter based on determining whether the second player is an opponent of the first player.

18. The system according to claim 10, wherein the processor is configured to execute the instructions for:
preventing the game parameter from effecting players associated with additional terminals located outside of the first region.

19. A method comprising:
acquiring positional information, using a global positioning system (GPS) unit, for identifying a position of a first terminal associated with a first player;
acquiring a map corresponding to a first region having, as a center of the map, the position of the first terminal;
receiving positional information for a second terminal, wherein the second terminal is associated with a second player;
identifying, as a chain region, a second region having, as a center thereof, the second terminal;
acquiring a map corresponding to the chain region;
acquiring facility information contained in the map corresponding to the chain region;
setting a game parameter corresponding to the first player and corresponding to the second player based on the facility information in the chain region; and
progressing the game based on the game parameter.

20. The method according to claim 19, wherein the setting the game parameter comprises:
determining whether the first player is an opponent with the second player; and
setting the game parameter based on whether the first player is the opponent with the second player.

* * * * *